Patented Sept. 12, 1944

2,358,063

UNITED STATES PATENT OFFICE 2,358,063

PREPARATION OF PHENYL MALONIC ESTER

Alvin C. Flisik, Haverstraw, Marc T. Inman, Nyack, and William P. Bitler, Haverstraw, N. Y., assignors to Kay-Fries Chemicals, Inc., West Haverstraw, N. Y., a corporation of New York No Drawing. Application September 12, 1941, Serial No. 410,574

5 Claims. (Cl. 260—475)

This invention relates to preparation of esters of dibasic acids, containing at least one acetonyl residue, and more particularly to the preparation of phenyl malonic ester.

Hitherto, in the preparation of phenyl malonic ester, ethyl phenyl acetate is condensed with di-ethyl oxalate in the presence of sodium ethylate, to form phenyl acetic oxalyl ester according to the following equation:

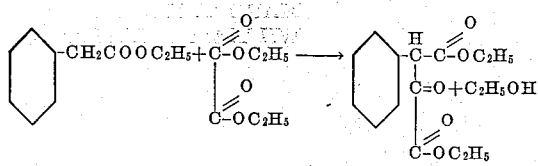

The oxalyl compound is usually obtained as the sodium derivative. Under ordinary conditions this sodium derivative precipitates in the form of a solid gel, even in the presence of large amounts of alcohol. Such material is difficult to handle and has the further and important disadvantage of making it extremely difficult to liberate the free oxalyl compound on subsequent acidification without having momentary excesses of acid, which excesses cause or induce hydrolysis of the free oxalyl compound. This untoward and undesired side reaction causes an appreciable loss in reagents that cannot be economically recovered.

It is a feature of novelty of the present invention to provide an improved process for the preparation of phenyl malonic ester in which undesirable hydrolytic reactions are avoided and substantially done away with.

In the practice of the present invention, and according to the reaction described above, the reaction conditions are changed to include an appreciable excess of ethyl phenyl acetate at the beginning of the reaction. By so doing it is found that the resulting sodium derivative will be caused to precipitate in a dispersed form, as a slurry which can be easily stirred. By adding the acid gradually to this mixture, using reasonable care to prevent or avoid any momentary excesses of acid, the hydrolysis of the free oxalyl compound is cut to a minimum and a maximum yield of the final product is assured.

By way of illustration, the following example is given. A solution of sodium ethylate in ethanol is prepared by adding 42 lbs. or sodium to 646 lbs. of anhydrous ethanol, the usual precautions being observed. To this solution is added a mixture of 250 lbs. di-ethyl oxalate and 989 lbs. ethyl phenyl acetate (250% excess). This oxalate-acetate mixture is added to the ethylate as rapidly as heat can be dissipated by cooling water in the jacket of the reaction vessel or still. Desirably, the temperature should be held to a maximum of 30° C. After completion of the reaction the excess alcohol is distilled off under a low vacuum (100–110 mm.). Following this, the reaction mixture is cooled to 30° C., and diluted by addition of 650 lbs. of water. To this diluted solution 200 lbs. of 36% HCl solution are added, at such a rate that the aqueous solution is maintained thus slightly acid to brom-phenol indicator. When the sodium compound has been all decomposed by the acid, the supernatant oil layer is separated from the water layer and the oil layer is then washed with an additional amount of water (300 lbs.). The washed oil layer is then transferred to a still and heated, under a vacuum of 230 mm., to a temperature of 140–150° C. Under these conditions the oxalyl compound will be decomposed giving off carbon monoxide and leaving a residue of phenyl malonic acid ethyl ester dissolved in the excess of unreacted ethyl phenyl acetate. This mixture is separated by fractionation and the recovered ethyl phenyl acetate is then returned to the process.

As noted above, it will be appreciated that the novel commercial procedure herein disclosed minimizes or prevents excessive hydrolysis of the intermediate compound phenyl oxalyl acetic ester, and, as a result, a higher yield of phenyl malonic ethyl ester is obtained.

What is claimed is:

1. In the commercial preparation of phenyl malonic ester from ethyl phenyl acetate and di-ethyl oxalate in the presence of sodium ethylate, the improvement comprising conducting the initial reaction in the presence of an excess of the ethyl phenyl acetate to cause the precipitation of the sodium phenyl acetic oxalyl ester as a slurry instead of the usual solid gel, and thereafter withdrawing the slurry from the reaction vessel.

2. The improved commercial process for the preparation of phenyl malonic ester, comprising reacting an excess of ethyl phenyl acetate with di-ethyl oxalate in the presence of sodium ethylate to form sodium phenyl acetic oxalyl ester, acidifying the reaction mixture to decompose the sodium ester, and separating the products of the reaction.

3. The improved commercial process for the preparation of phenyl malonic ester, comprising reacting an excess of ethyl phenyl acetate with di-ethyl oxalate in the presence of sodium ethylate to form sodium phenyl acetic oxalyl ester, acidifying the reaction mixture to decompose the sodium ester, separating the reagents and reaction products from associated water, washing the separated products with additional water, distilling the washed products under vacuum, and at a temperature sufficient to cause the oxalyl compound to decompose into carbon monoxide and a residue of phenyl malonic acid ethyl ester dissolved in the excess of the ethyl phenyl acetate, separating the ester by fractionation and recycling the recovered acetate.

4. Commercial process for manufacturing phenyl malonic ester consisting in adding 250 lbs. di-ethyl oxalate in a 250% excess of ethyl phenyl acetate 989 lbs. to a solution of sodium ethylate in ethyl alcohol comprised of 42 lbs. of sodium in 646 lbs. of anhydrous alcohol, with cooling to a maximum temperature of 30° C., distilling off excess alcohol, cooling the reaction mixture to 30° C., adding 650 lbs. of water; then introducing 250 lbs. of 36% HCl solution, at such a rate that the aqueous solution is maintained just slightly acid to brom-phenol, to decompose the sodium compound; separating the oil layer from the water layer; washing the oil layer with substantially 300 lbs. of water; distilling the washed oil layer at a temperature of 140–150° C. under a vacuum of 230 mm., causing the oxalyl compound to decompose giving off carbon monoxide and leaving phenyl malonic acid ethyl ester dissolved in the excess of ethyl phenyl acetate; separating the phenyl malonic ester from the excess of ethyl phenyl acetate by fractionation and recycling the recovered acetate.

5. A commercial process for manufacturing phenyl malonic ester consisting in condensing substantially 250 lbs. of diethyl oxalate in an excess of 989 lbs. of ethyl phenyl acetate comprising a 250% excess, in the presence of an ethanol solution of sodium ethylate comprised of substantially 42 lbs. of sodium in 646 lbs. of anhydrous ethanol as condensing agents, and at a maximum temperature of 30° C., to precipitate the sodum derivative of the reaction product as a non-gelling slurry, distilling off the excess alcohol in vacuo, cooling to 30° C., diluting the mixture with 650 lbs. of water and converting the said product to the free oxalyl compound by the controlled addition of 200 lbs. of 36% aqueous HCl while maintaining the aqueous solution slightly acid to brom-phenyl indicator; separating the oily layer formed from the water, washing in further quantities of water and distilling the washed oily layer under vacuum to cause the oxalyl compound to decompose giving off carbon monoxide and leaving a residue of phenyl malonic acid ester dissolved in the excess of ethyl phenyl acetate; and thereafter separating the phenyl malonic ester from the excess of ethyl phenyl acetate.

ALVIN C. FLISIK.
MARC T. INMAN.
WILLIAM P. BITLER.